US007075741B1

(12) United States Patent  
Soetarman et al.

(10) Patent No.: US 7,075,741 B1
(45) Date of Patent: Jul. 11, 2006

(54) SYSTEM AND METHOD FOR AUTOMATICALLY DETERMINING MAGNETIC ECCENTRICITY OF A DISK

(75) Inventors: Ronny Soetarman, Fremont, CA (US); Vamsi M. Velidandla, Hayward, CA (US); Jimmy Leung, Morgan Hill, CA (US); Steven W. Meeks, Fremont, CA (US)

(73) Assignee: KLA Tencor Technologues Corporation, Milpitas, CA (US)

( * ) Notice: Subject to any disclaimer, the term of this patent is extended or adjusted under 35 U.S.C. 154(b) by 205 days.

(21) Appl. No.: 10/867,609

(22) Filed: Jun. 14, 2004

(51) Int. Cl.
*G11B 5/02* (2006.01)
(52) U.S. Cl. ...................................... 360/25
(58) Field of Classification Search ............... None
See application file for complete search history.

(56) References Cited

U.S. PATENT DOCUMENTS

| | | | |
|---|---|---|---|
| 3,885,875 A | 5/1975 | Rosenfeld et al. |
| 4,182,259 A | 1/1980 | Garner et al. |
| 4,332,477 A | 6/1982 | Sato |
| 4,585,348 A | 4/1986 | Chastang et al. |
| 4,668,860 A | 5/1987 | Anthon |
| 4,870,631 A | 9/1989 | Stoddard |
| 4,873,430 A | 10/1989 | Juliana et al. |
| 5,017,012 A | 5/1991 | Merritt, Jr. et al. |
| 5,129,724 A | 7/1992 | Brophy et al. |
| 5,189,481 A | 2/1993 | Jann et al. |
| 5,196,906 A | 3/1993 | Stover et al. |
| 5,270,794 A | 12/1993 | Tsuji et al. |
| 5,293,216 A | 3/1994 | Moslehi |
| 5,313,542 A | 5/1994 | Castonguay |
| 5,406,082 A | 4/1995 | Pearson et al. |
| 5,416,594 A | 5/1995 | Gross et al. |
| 5,446,549 A | 8/1995 | Mazumder et al. |
| 5,463,897 A | 11/1995 | Prater et al. |
| 5,586,101 A | 12/1996 | Gage et al. |
| 5,608,527 A | 3/1997 | Valliant et al. |
| 5,610,897 A | 3/1997 | Yamamoto et al. |
| 5,631,171 A | 5/1997 | Sandstrom et al. |
| 5,633,747 A | 5/1997 | Nikoonahad |
| 5,644,562 A | 7/1997 | de Groot |
| 5,694,214 A | 12/1997 | Watanabe et al. |
| 5,715,058 A | 2/1998 | Bohnert et al. |
| 5,726,455 A | 3/1998 | Vurens |

(Continued)

FOREIGN PATENT DOCUMENTS

JP 3-221804 9/1991

(Continued)

OTHER PUBLICATIONS

W.C. Leung, W. Crooks, H. Rosen and T. Strand, *An Optical Method Using a Laser and an Integrating Sphere Combination for Characterizing the Thickness Profile of Magnetic Media*, Sep. 1989, IEEE Transaction on Magnetics, vol. 25, No. 5. pp. 3659-3661.

(Continued)

*Primary Examiner*—Wayne Young
*Assistant Examiner*—Glenda P. Rodriguez
(74) *Attorney, Agent, or Firm*—Caven & Aghevil LLC (57) ABSTRACT

An embodiment of the present invention includes receiving a disk having a servo pattern and automatically identifying the center of the servo pattern. The present invention also automatically identifies the center of the physical disk and then automatically identifying the variance between the servo center and physical disk center.

10 Claims, 7 Drawing Sheets

U.S. PATENT DOCUMENTS

| | | | |
|---|---|---|---|
| 5,748,305 | A | 5/1998 | Shimono et al. |
| 5,754,297 | A | 5/1998 | Nulman |
| 5,777,740 | A | 7/1998 | Lacey et al. |
| 5,798,829 | A | 8/1998 | Vaez-Iravani |
| 5,864,394 | A | 1/1999 | Jordan, III et al. |
| 5,875,029 | A | 2/1999 | Jann et al. |
| 5,880,838 | A | 3/1999 | Marx et al. |
| 5,903,342 | A | 5/1999 | Yatsugake et al. |
| 5,909,276 | A | 6/1999 | Kinney et al. |
| 5,951,891 | A | 9/1999 | Barenboim et al. |
| 5,978,091 | A | 11/1999 | Jann et al. |
| 5,985,680 | A | 11/1999 | Singhal et al. |
| 5,986,761 | A | 11/1999 | Crawforth et al. |
| 5,986,763 | A | 11/1999 | Inoue |
| 5,995,226 | A | 11/1999 | Abe et al. |
| 6,028,671 | A | 2/2000 | Svetkoff et al. |
| 6,034,378 | A | 3/2000 | Shiraishi |
| 6,043,502 | A | 3/2000 | Ahn |
| 6,081,325 | A | 6/2000 | Leslie et al. |
| 6,088,092 | A | 7/2000 | Chen et al. |
| 6,091,493 | A | 7/2000 | Stover et al. |
| 6,107,637 | A | 8/2000 | Watanabe et al. |
| 6,118,525 | A | 9/2000 | Fossey et al. |
| 6,134,011 | A | 10/2000 | Klein et al. |
| 6,157,444 | A | 12/2000 | Tomita et al. |
| 6,169,601 | B1 | 1/2001 | Eremin et al. |
| 6,172,752 | B1 | 1/2001 | Haruna et al. |
| 6,201,601 | B1 | 3/2001 | Vaez-Iravani et al. |
| 6,248,988 | B1 | 6/2001 | Krantz |
| 6,271,916 | B1 | 8/2001 | Marxer et al. |
| 6,307,627 | B1 | 10/2001 | Vurens |
| 6,353,222 | B1 | 3/2002 | Dotan |
| 6,384,910 | B1 | 5/2002 | Vaez-Iravani et al. |
| 6,509,966 | B1 | 1/2003 | Ishiguro et al. |
| 6,515,745 | B1 | 2/2003 | Vurens et al. |
| 6,542,248 | B1 | 4/2003 | Schwarz |
| 6,603,542 | B1 | 8/2003 | Chase et al. |
| 6,630,996 | B1 | 10/2003 | Rao et al. |
| 6,639,662 | B1 | 10/2003 | Vaez-Iravani et al. |
| 6,757,056 | B1 | 6/2004 | Meeks et al. |
| 6,804,003 | B1 | 10/2004 | Wang et al. |
| 6,809,809 | B1 | 10/2004 | Kinney et al. |

FOREIGN PATENT DOCUMENTS

| | | |
|---|---|---|
| JP | 04-162215 | 5/1992 |
| JP | 10-227764 | 8/1998 |
| JP | 1-173994 | 7/1999 |
| WO | WO 98/52019 | 11/1998 |

OTHER PUBLICATIONS

Steven W. Meeks, Walter E. Weresin, and Hal J. Rosen, *Optical Surface Analysis of the Head-Disk-Interface of Thin Film Disks*, Jan. 1995, Transactions of the ASME, Journal of Tribology, vol. 117, pp. 112-118.

Steven Meeks, Maxtor and Rusmin Kudinar, *The Next Battleground: Head-Disk Interface*, Mar. 1998, Data Storage, Test & Measurement, pp. 29-30, 34 and 38.

*Laser Scanning Surface Profilometer*, [online], Aug. 1970, [retrieved Jan. 29, 2001], pp. 789-790, Retrieved from the Internet: <URL: http://www.delphion.com/tdbs/tdb?&order=7OC101758.

Meeks, Steven W.: "A Combined Ellipsometer, Reflectometer, Scatterometer and Kerr Effect Microscope for Thin Film Disk Characterization," Machine Vision Applications in Industrial Inspection VIII, Proceedings of SPIE, vol. 3966, 2000, pp. 385-391, XP001085220.

Circumferential direction

Figure 5

Circumferential direction

← Magnetic pattern edge

Figure 9

← Magnetic pattern edge

Figure 10

← Magnetic pattern edge

Figure 11

← Magnetic pattern edge

Figure 12

SYSTEM AND METHOD FOR AUTOMATICALLY DETERMINING MAGNETIC ECCENTRICITY OF A DISK

FIELD OF THE INVENTION

The present invention relates to the field of disk drives and more particularly to automatically identifying a difference between the center of a magnetic servo pattern center and a physical center of a thin film magnetic disk.

BACKGROUND OF THE INVENTION

When a hard disk is manufactured a special pattern is written in a code called a Gray code on the surface of the platters, while the drive is open in a clean room, with a machine called a servo writer. Conventional servo writing is performed in a clean room environment with external sensors invading a disk-drive head disk assembly to provide the precise angular and radial position information to write the servo patterns on the disk.

There are a fixed number of servo sectors per track and the sectors are adjacent to one another. This pattern is permanent and cannot be changed by writing normal data to the drive.

The electronics use feedback from the heads, which read the Gray code pattern, to very accurately position, and constantly correct the radial position of the appropriate head over the desired track, at the beginning of each sector, to compensate for variations in platter geometry, caused by mechanical stress and thermal expansion and contraction. Altogether, the head positioning components form what is known as closed-loop servo system—a marvelous (and, perhaps, dangerous) thing to watch operate in a drive which has been opened.

Recently, tools have been developed that write the servo pattern on multiple disks prior to the assembly of the drive head. This process can increase the rate at which servo patterns are written, however the tolerances need to be very small between the center of the servo pattern and physical center of the disk in order to enable a subsequently attached thin film disk head to be able to read and write onto the thin film magnetic disk.

What is needed is an automatic way of measuring the servo pattern and physical disk to identify a difference between the center of a servo pattern and the center of the physical disk in order to keep the distance between the two centers within a specified tolerance.

SUMMARY OF THE INVENTION

An embodiment of the present invention includes receiving a disk having a servo pattern and automatically identifying the center of the servo pattern. The present invention also automatically identifies the center of the physical disk and then automatically identifies the variance between the servo center and physical disk center.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

A preferred embodiment of the present invention is now described with reference to the figures where like reference numbers indicate identical or functionally similar elements. Also in the figures, the left most digit(s) of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not necessarily related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

As described above, the present invention receives a disk having servo pattern and automatically identifies the center of the servo pattern. The present invention also automatically identifies the center of the physical disk and then automatically identifies the variance (magnetic eccentricity) between the center of the servo pattern and the physical disk center. The magnetic eccentricity of a disk is the distance between the physical center of a disk and the pattern center of the disk, e.g., as prescribed by the magnetic write pattern on the disk. Automatically identifying the magnetic eccentricity provides advantages including providing a detailed description of the disk that can be provided to the disk head controller to facilitate calibration of the disk head on a disk. The magnetic pattern written upon the disk may be a servo pattern or any other type of pattern, which is continuous or discrete around the circumference of the magnetic disk.

Figure 1:
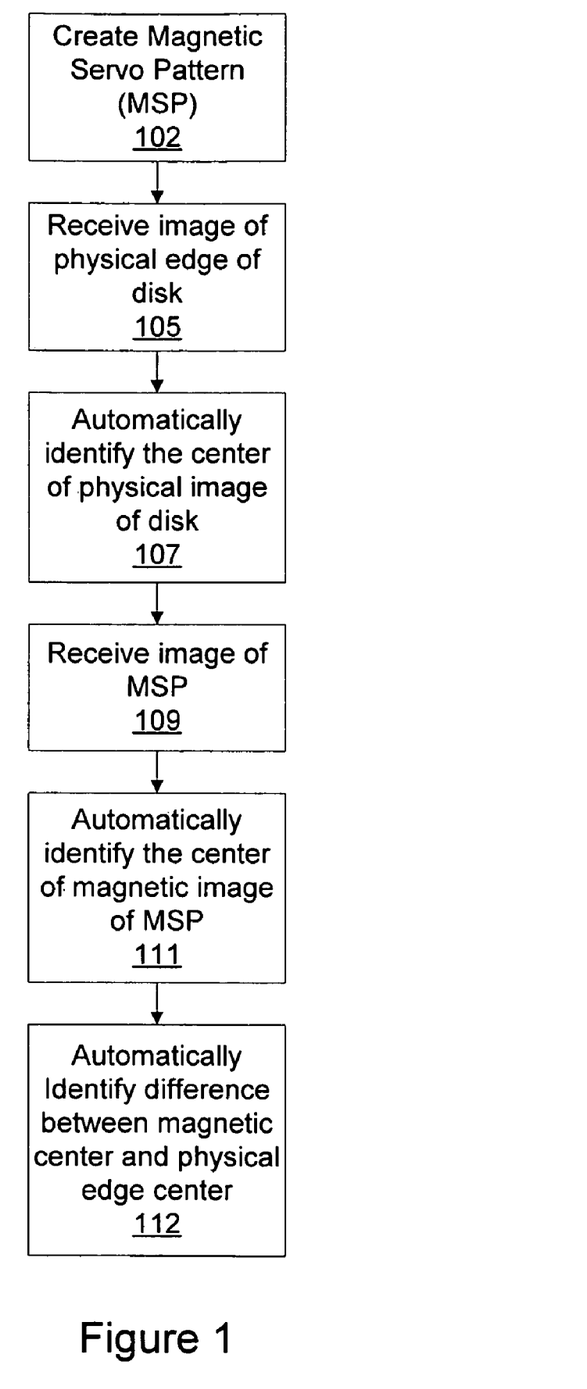
FIG. 1 is a flowchart illustrating the method of the present invention according to one embodiment of the present invention.

FIG. 1 is a flowchart illustrating the method of the present invention according to one embodiment of the present invention. A magnetic servo pattern (MSP) is created 102 on a disk. This can be accomplished using conventional techniques either before or after the disk is combined in the disk unit having a disk head for reading and/or writing data to the disk. The present invention also receives 105 (or creates) an image of the physical edge of the disk and automatically identifies 107 the center of the physical edge of the disk. Some of the possible techniques for accomplishing this are described below.

The present invention receives 102 the disk and identifies 109 the magnetic servo pattern on the disk. The present invention can identify 109 the magnetic servo pattern using one or more techniques. Some of the possible techniques for accomplishing this are described below. In one embodiment, an image of the magnetic servo pattern is created. The present invention then automatically identifies 111 the center of the magnetic servo pattern image.

The present invention then automatically identifies 112 the magnetic eccentricity of the disk, i.e., the present invention automatically identifies the difference between the magnetic center and the physical center of the disk. It is envisioned that the steps outlined in FIG. 1 can be performed in an order different from that described above without departing from the scope of the present invention.

Figure 2:
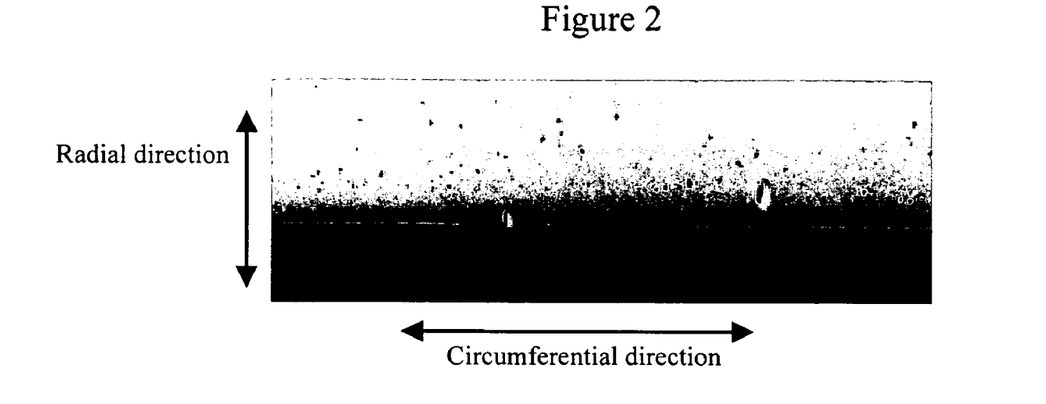
FIG. 2 is an illustration of a sub-image that includes the inner diameter edge according to one embodiment of the present invention.

After creating or receiving 105 an image of the physical edge of the disk the present invention automatically identifies 107 the physical center of the disk. This can be accomplished in a variety of ways. In one embodiment the present invention creates a sub-image which includes the inner diameter edge. In alternate embodiments the outer edge is used. FIG. 2 is an illustration of a sub-image that includes the inner diameter edge identified as the region separating the dark and light portions where the light portion represents the disk.

The image can be created using an optical surface analyzer to acquire a magnetic image of the disk from, for example, the outside edge of the disk to the inside diameter of the disk. Such an optical surface analyzer that can be used to create such an image is the OSA 6100 or OSA 5100 that is available from Candela Instruments, Inc, Fremont Calif. In one embodiment of the present invention the edge is more clearly identified by performing a filtering operation. For example, in one embodiment a track-by-track median filtering operation is performed in the circumferential direction to reduce image noise. The track-by-track median filtering belongs to a class of filter called nonlinear filters. As an example, consider a row of pixel data that begins with the following values:

| Value | 23 | 65 | 64 | 120 | 187 | 90 | 47 | 209 | 72 | 53 | 91 | 97 | 99 |
|---|---|---|---|---|---|---|---|---|---|---|---|---|---|
| Index | 1 | 2 | 3 | 4 | 5 | 6 | 7 | 8 | 9 | 10 | 11 | 12 | 13 |

Suppose we have picked that our kernel length for the circumferential median filter is 9 pixels, that means from the beginning of the data we are looking at these 9 data values:
23 65 64 120 187 90 47 209 72

Now we order (rank) these 9 data values in increasing value:
23 47 64 65 72 90 120 187 209

The median value of the ordered list of values is 72, which means that there are as many elements below this median value (4 elements) as there are above this median value. So the data with index 5 which has original value of 187 is now being replaced with the median value which is 72. So the filtered row of data will look something as follows:

| Value | 23 | 65 | 64 | 120 | 72 | ... |
|---|---|---|---|---|---|---|
| Index | 1 | 2 | 3 | 4 | 5 | 6 |

Index 1, 2, 3 and 4 values are not replaced since they occur before half of the kernel length. However index 6, 7, 8 and so on can now be determined by moving the kernel by one more index. So for index 6, the new values in the kernel are:
65 64 120 187 90 47 209 72 53

Then the above set of values will be re-ordered and ranked to determine the median value, and that median value will be the new value for index 6. The process is repeated until the whole data in the image is processed.

Figure 3:
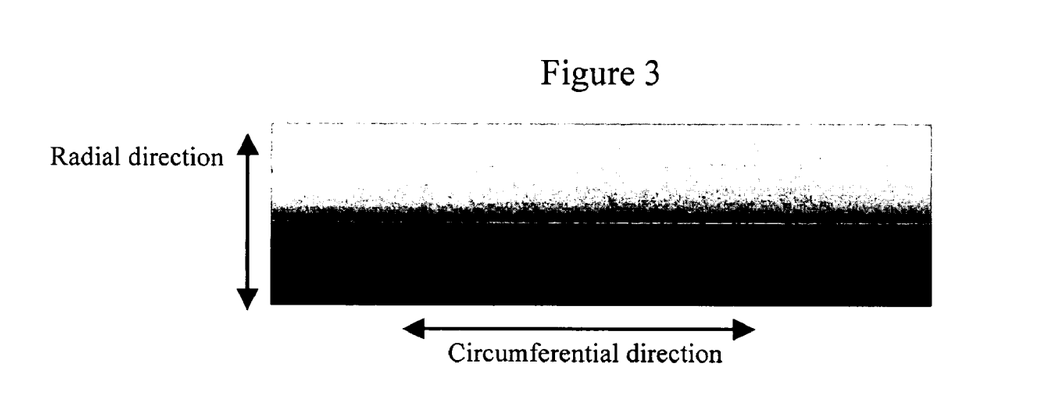
FIG. 3 is an illustration showing the inner diameter edge after the circumferential median filtering operation according to one embodiment of the present invention.

This circumferential filter is performed to reduce/remove the noise or irregularities on the disk edge. FIG. 3 is an illustration showing the inner diameter edge after the circumferential median filtering operation according to one embodiment of the present invention.

Figure 4:
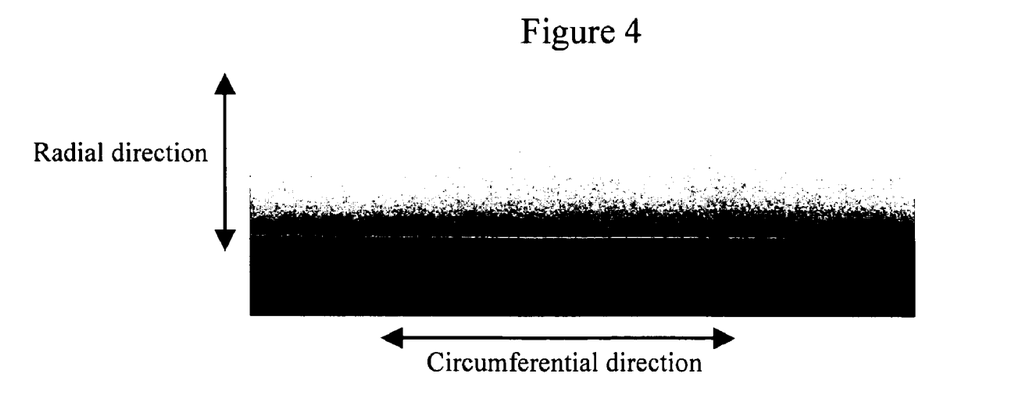
FIG. 4 is an illustration showing the inner diameter edge after the radial median filtering operation according to one embodiment of the present invention.

In one embodiment additional filtering can also be performed. For example a radial column by radial column median filtering operation along the radial direction can be performed to further reduce noise or irregularities on the disk edge. This type of filtering is similar to the circumferential filtering described above but in the radial direction. FIG. 4 is an illustration showing the inner diameter edge after the radial median filtering operation according to one embodiment of the present invention.

Figure 5:
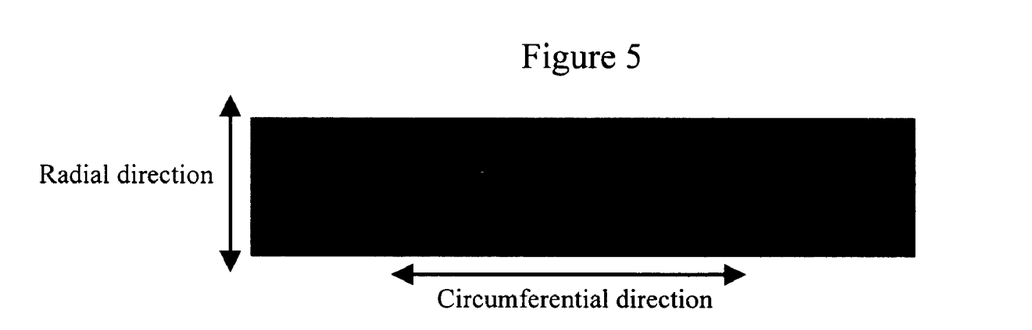
FIG. 5 is an illustration of an inner diameter edge after applying the horizontal edge detection technique according to one embodiment of the present invention.

Some embodiments of the present invention apply a conventional two-dimensional Laplacian horizontal edge detection to filter. Additional details about the two-dimensional Laplacian horizontal edge detection is found in "Digital Imaging" by Howard E. Burdick, McGraw-Hill, New York, 1997, pages 105–109. The two-dimensional horizontal edge detection is performed by using a convolution operation with a two dimensional kernel. By performing a convolution operation with this special kernel, the resulting image is uniform everywhere except where there is a horizontal feature. FIG. 5 is an illustration of an inner diameter edge after applying the horizontal edge detection technique according to one embodiment of the present invention. The horizontal disk edge is extracted based upon either the minimum or maximum pixel values. In FIG. 5 the dark line (minimum pixel values) corresponds to the disk edge.

Figure 6:
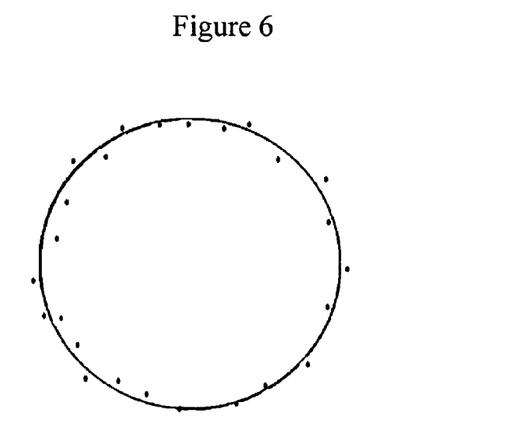
FIG. 6 illustrates the operation of a circle fit algorithm on multiple servo sectors according to one embodiment of the present invention.

In one embodiment of the present invention a circle fit algorithm uses the edge data for multiple servo sectors or the edge data for the inner diameter of the disk to identify a circle that best fits the identified edges. FIG. 6 illustrates the operation of a circle fit algorithm on multiple servo sectors. In FIG. 6 each servo sector is identified by a point while in some embodiments the edge (or some portion thereof) identified for multiple servo sectors is used by the circle fit algorithm. In FIG. 6 the dots represent the extracted edge and the circle drawing represents the estimated/fitted circle that will minimize the error from the dots to the fitted circle. The circle fit algorithm also calculates the center for the circle along with the radius. One example of a circle fit algorithm is described in C. L. Lawson & R. J. Hanson, Jet Propulsion Laboratory, "Solving Least Squares Problems" (Prentice Hall, 1974) which is incorporated by reference herein in its entirety.

As indicated above, the present invention envisions alternate techniques can be used to identify the physical center of the disk or the center of the magnetic pattern without departing from the present invention.

Figure 7:
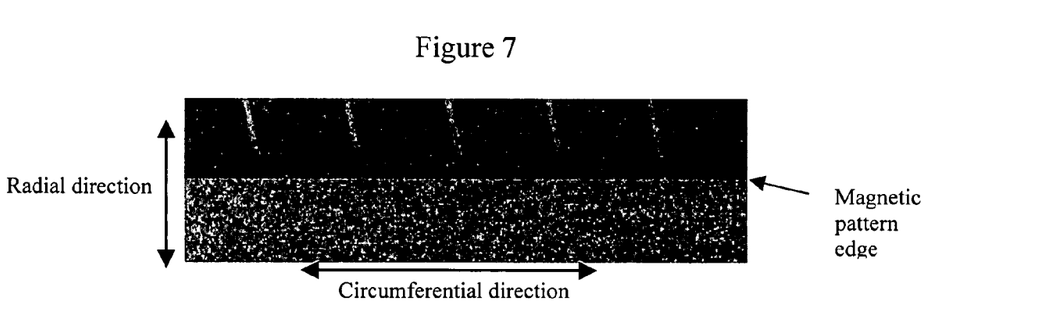
FIG. 7 is an illustration of a sub-image of the magnetic pattern edge where the magnetic pattern has a substantially uniform level across the circumferential direction according to one embodiment of the present invention.
Figure 8:
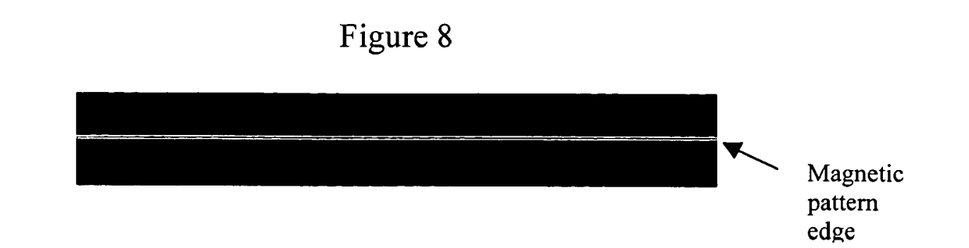
FIG. 8 is an illustration of a magnetic pattern edge after filtering and edge detection according to one embodiment of the present invention.

After receiving 109 the image of the magnetic servo pattern, the present invention automatically identifies 111 the center of the magnetic image of the magnetic servo pattern. It is envisioned that this identification can be accomplished in a variety of ways without departing from the scope of the present invention. In one embodiment, the edge of the magnetic boundary is detected using a filtering technique similar to that described above with respect to identifying the physical edge. A sub-image of the magnetic pattern is created using, for example, the Candela OSA 6100 or OSA 5100 optical surface analyzer identified above. FIG. 7 is an illustration of a sub-image of the magnetic pattern edge where the magnetic pattern has a substantially uniform level across the circumferential direction according to one embodiment of the present invention. In one embodiment circumferential and/or radial median filtering is used using the technique described above and then a horizontal edge detection technique is used, as described above. FIG. 8 is an illustration of a magnetic pattern edge after filtering and edge detection according to one embodiment of the present invention. In this example the light area represents the magnetic pattern edge.

Figure 9:
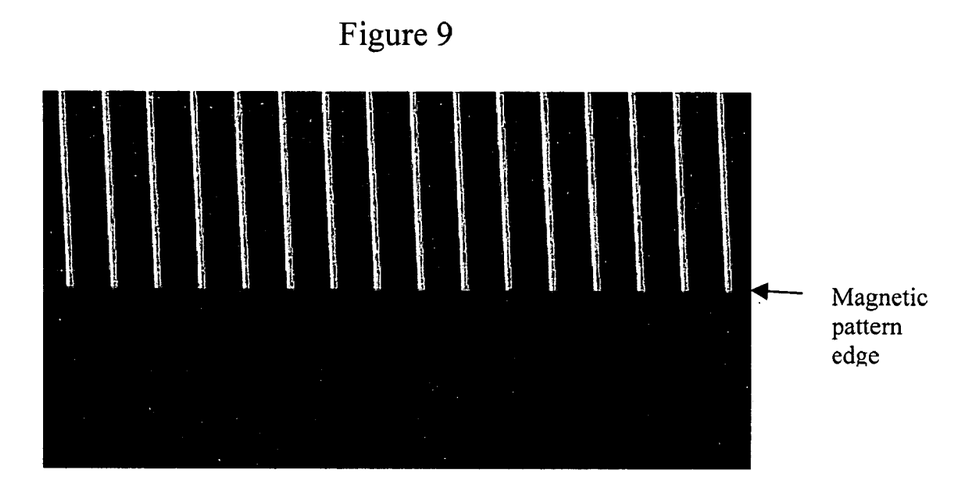
FIG. 9 is an illustration of a magnetic image boundary according to one embodiment of the present invention.
Figure 10:
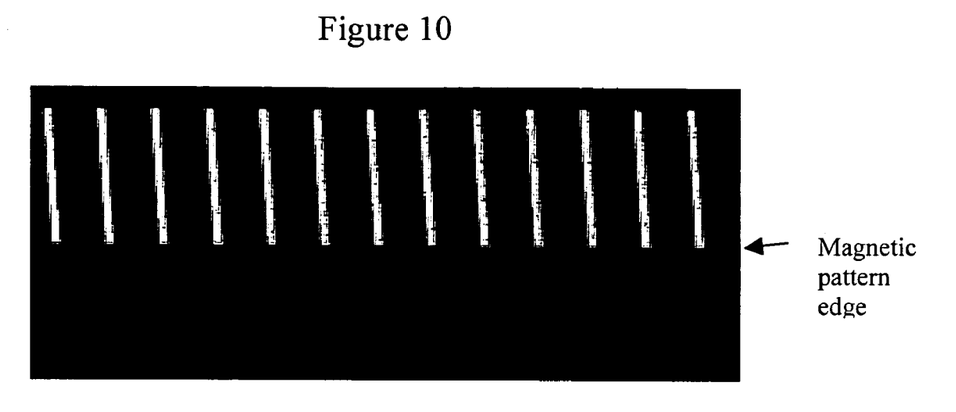
FIG. 10 is an illustration of a magnetic pattern image after applying a one-dimensional kernel algorithm according to one embodiment of the present invention.

In some processes the magnetic pattern is not substantially uniform across the circumferential direction. Instead, the magnetic image pattern boundary is identified as vertical stripes. FIG. 9 is an illustration of a magnetic image boundary according to one embodiment of the present invention. A sub-image of the magnetic pattern is received or created. In one embodiment of the present invention a feature base detection based upon a one-dimensional kernel and a positive and/or negative threshold is used to create a higher contrast image of the magnetic pattern. This can be accomplished using a one-dimensional horizontal median filter kernel along with a threshold to detect all the pixels which lie above (or below) the medial value by an amount greater than the threshold. The kernel length must be longer than the horizontal length of the magnetic servo wedge (the white vertical bars in FIGS. 9 and 10). FIG. 10 is an illustration of a magnetic pattern image after applying a one-dimensional kernel algorithm according to one embodiment of the present invention.

Figure 11:
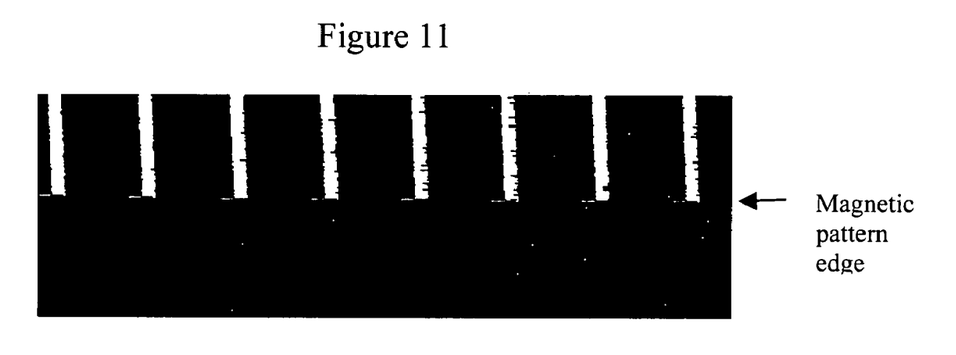
FIG. 11 is an illustration of the bottom edges of the magnetic pattern image after applying a one-dimensional kernel algorithm according to one embodiment of the present invention.

In one embodiment of the present invention, the edge (for example the bottom edge) of the features is identified. FIG. 11 is an illustration of the bottom edges of the magnetic pattern image after applying a one-dimensional kernel algorithm according to one embodiment of the present invention.

In one embodiment a one-dimensional kernel with a threshold is applied to the image (FIG. 9) in the horizontal direction. This generates a detected map with all the features that are outside the specified threshold as shown in FIG. 10. The detected features are then examined and features smaller than a certain specified value (for example, 10 pixels) are ignored. For all the larger features, the bottom boundary is located and this is the inner edge of magnetic marking (the servo pattern). This is identified as the bottom edge in FIG. 11.

A circle fit algorithm, such as that described above, can be used to identify the circle that best fits the magnetic pattern image. The circle fit algorithm will also identify the center of the circle and the radius.

The magnetic eccentricity is automatically identified 112 by determining the difference between the center of the disk and the center of the magnetic pattern.

In alternative embodiments, the magnetic servo pattern can be measured or identified using any of a variety of techniques including using a polar Kerr effect, a longitudinal Kerr effect, a transverse Kerr effect, and/or a Bitter magnetic imaging technique. The three Kerr effects: polar, longitudinal and transverse are optical means of imaging magnetic patterns. The three Kerr effects differ with regards to the orientation of the magnetization with respect to the polarization of the optical beam and in the strength of their response to magnetic patterns, with the Polar Kerr effect having the strongest response to a change in magnetic orientation and the longitudinal and transverse having much smaller responses. For a conventional longitudinally recorded magnetic disk the longitudinal or transverse Kerr effect would be the mechanism responsible for magnetic imaging. For a perpendicularly recorded magnetic disk the Polar Kerr effect would be the mechanism responsible for magnetic imaging.

The Bitter magnetic imaging technique consists of decorating the surface of a magnetic disk with a fluid that contains a suspension of tiny magnetic particles. As the suspending fluid evaporates, the magnetic particles will be attracted to the positive and negative poles of the magnetized areas on the disk. In this manner the magnetic pattern on the thin film disk may be imaged.

Figure 12:
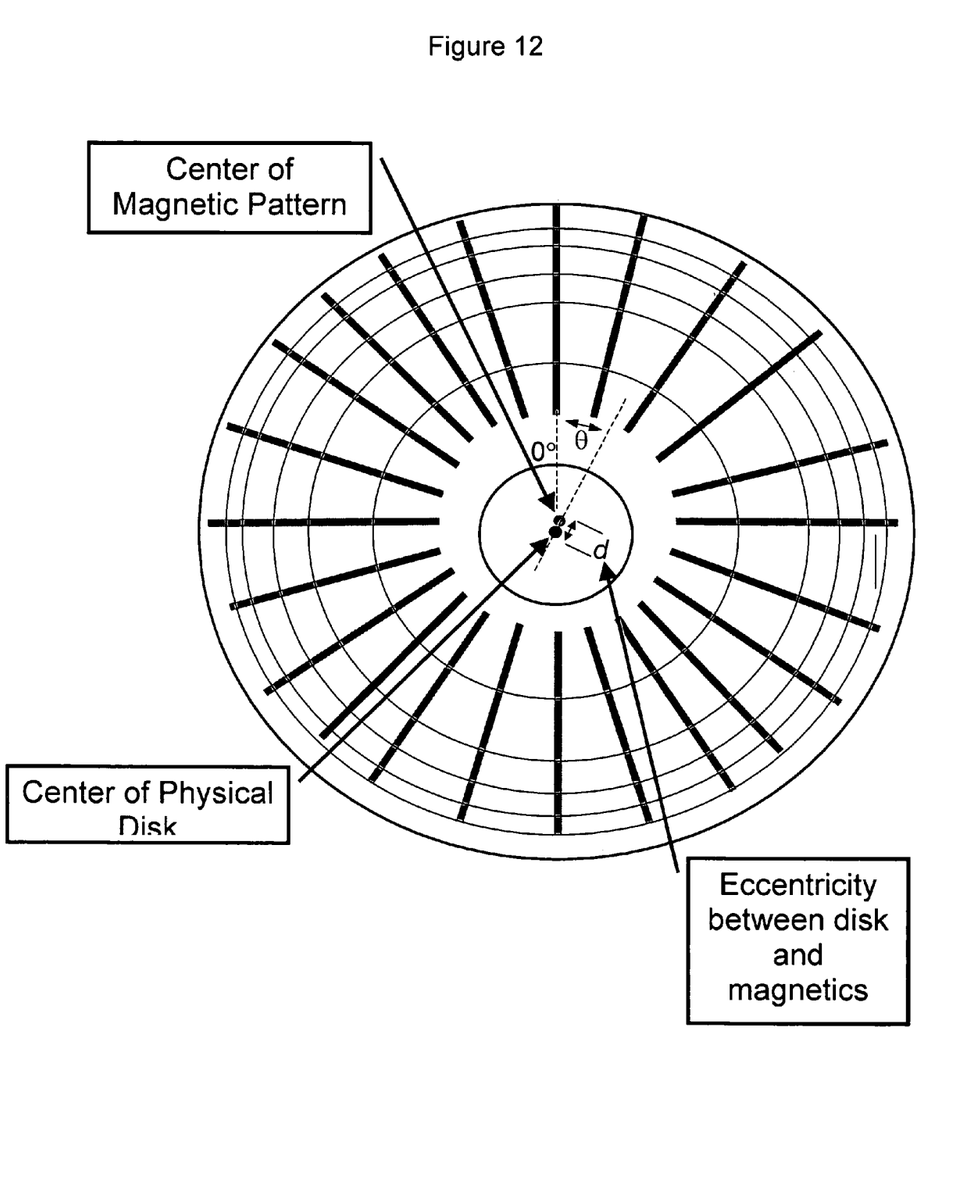
FIG. 12 is an illustration of the magnetic pattern and the disk physical edges showing the magnitude of the eccentricity and the angle the eccentricity makes with respect to a reference position on the disk according to one embodiment of the present invention.

FIG. 12 shows an illustration of the disk magnetic pattern and the disk physical edges. The disk physical center is separated from the magnetic pattern center by a distance d. This distance d is oriented at an angle θ with respect to a reference angle on the disk. In this case, the reference angle is the zero degree position shown in FIG. 12. This method will allow the computation of both the distance d and the angle θ.

While particular embodiments and applications of the present invention have been illustrated and described herein, it is to be understood that the invention is not limited to the precise contruction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for identifying an eccentricity of a first disk comprising the steps of:
    receiving the first disk having a magnetic pattern;
    automatically creating an image of the first disk identifying a first edge positions of said disk;
    automatically identifying a disk center position corresponding to the center of said first disk
    automatically creating an image of disk identifying the positions of said magnetic pattern;
    automatically identifying a magnetic center position corresponding to the center of said magnetic pattern on the first disk; and
    automatically identifying the difference between said disk center position and said magnetic center position to automatically identify the eccentricity of the first disk.

2. The method of claim 1 wherein said magnetic pattern is a servo pattern.

3. The method of claim 1 wherein said first disk is a disk drive and wherein said eccentricity identification occurs prior to installation of a disk drive magnetic read/write head.

4. The method of claim 1 wherein the step of automatically identifying the difference between said disk center position and said magnetic center position includes the step of identifying the angle between a disk reference position and a line formed by said magnetic center position and said disk center position.

5. A system for identifying an eccentricity of a first disk comprising:
    receiving means, for receiving the first disk having a magnetic pattern;
    first image creating means, for automatically creating an image of the first disk identifying a first edge positions of said disk;
    first means, for automatically identifying a disk center position corresponding to the center of said first disk
    second image creating means, for automatically creating an image of disk identifying the positions of said magnetic pattern;
    second means, for automatically identifying a magnetic center position corresponding to the center of said magnetic pattern on the first disk; and
    third means, for automatically identifying the difference between said disk center position and said magnetic center position to automatically identify the eccentricity of the first disk.

6. The system of claim 5 wherein said magnetic pattern is a servo pattern.

7. The system of claim 5 wherein said first disk is a disk drive and wherein said eccentricity identification occurs prior to installation of a disk drive magnetic read/write head.

8. The system of claim 5 wherein said third means identifies the angle between a disk reference position and a line formed by said magnetic center position and said disk center position.

9. The system of claim 5 wherein said first and second image creating means are the same.

10. The system of claim 5, wherein said first, second and third means are a computing unit.

* * * * *